US006114692A

United States Patent [19]

Beu

[11] Patent Number: 6,114,692

[45] Date of Patent: Sep. 5, 2000

[54] TOTAL ION NUMBER DETERMINATION IN AN ION CYCLOTRON RESONANCE MASS SPECTROMETER USING ION MAGNETRON RESONANCE

[75] Inventor: Steven C. Beu, Austin, Tex.

[73] Assignee: Siemens Applied Automation, Inc., Bartlesville, Okla.

[21] Appl. No.: 09/086,611

[22] Filed: May 28, 1998

[51] Int. Cl.[7] .............................. H01J 49/00; B01D 59/44

[52] U.S. Cl. .............................................. 250/282; 250/286

[58] Field of Search ...................................... 250/282, 286, 250/291

[56] References Cited

U.S. PATENT DOCUMENTS

| | | | |
|---|---|---|---|
| 3,937,955 | 2/1976 | Comisarow et al. | 250/283 |
| 4,933,547 | 6/1990 | Cody | 250/282 |
| 4,959,543 | 9/1990 | McIver et al. | 250/291 |

*Primary Examiner*—Bruce C. Anderson
*Attorney, Agent, or Firm*—I Marc Asperas

[57] ABSTRACT

The total number of ions created br obtained during an ionization or ion introduction event in a Fourier transform ion cyclotron resonance mass spectrometer are determined either by using an on-resonance experimental technique or an off-resonance experimental technique. Both techniques exploit ion magnetron motion. In the on-resonance technique the spectrometer is excited in the magnetron mode and the single resonance signal resulting from this excitation is detected to determine the total number of ions. In the off-resonance technique the magnetron mode is excited at a frequency that is near the magnetron frequency while simultaneously detecting the resulting ion motion. The off-resonance technique leaves the ion population in a state that is amenable to subsequent analysis.

7 Claims, 8 Drawing Sheets

TOTAL ION NUMBER DETERMINATION IN AN ION CYCLOTRON RESONANCE MASS SPECTROMETER USING ION MAGNETRON RESONANCE

1. FIELD OF THE INVENTION

This invention relates to a mass spectrometer (MS) which uses the Fourier transform ion cyclotron resonance (FTICR) technique to determine the mass of ions and more particularly to the determination to the total number of ions created or obtained during an ionization or ion introduction event.

2. DESCRIPTION OF THE PRIOR ART

When a gas phase ion at low pressure is subjected to a uniform static magnetic field, the resulting behavior of the ion is determined by the magnitude and orientation of the ion velocity with respect to the magnetic field. If the ion is at rest, or if the ion has only a velocity parallel to the applied field, the ion experiences no interaction with the field.

If there is a component of the ion velocity that is perpendicular to the applied field, the ion will experience a force that is perpendicular to both the velocity component and the applied field. This force results in a circular ion trajectory that is referred to as ion cyclotron motion. In the. absence of any other forces on the ion, the angular frequency of this motion is a simple function of the ion charge, the ion mass, and the magnetic field strength:

$$\omega = qB/m \qquad \text{Eq. 1}$$

where:

ω=angular frequency (radians/second)

q=ion charge (coulombs)

B=magnetic field strength (tesla)

m=ion mass (kilograms)

The FTICR MS exploits the fundamental relationship described in Equation 1 to determine the mass of ions by inducing large amplitude cyclotron motion and then determining the frequency of the motion. The first use of the Fourier transform in an ion cyclotron resonance mass spectrometer is described in U.S. Pat. No. 3,937,955 entitled "Fourier Transform Ion Cyclotron Resonance Spectroscopy Method And Apparatus" issued to M. B. Comisarow and A. G. Marshall on Feb. 10, 1976.

The ions to be analyzed are first introduced to the magnetic field with minimal perpendicular (radial) velocity and dispersion. The cyclotron motion induced by the magnetic field effects radial confinement of the ions; however, ion movement parallel to the axis of the field must be constrained by a pair of "trapping" electrodes. These electrodes typically consist of a pair of parallel-plates oriented perpendicular to the magnetic axis and disposed on opposite ends of the axial dimension of initial ion population. The trapping electrodes are maintained at a potential that is of the same sign as the charge of the ions and of sufficient magnitude to effect axial confinement of the ions in the potential well thereby created between the electrode pair.

Some or all of the ions retained in the trapping potential well may also exhibit two additional modes of periodic motion in addition to the cyclotron mode previously described. The first is an axial "trapping" oscillation between the trap electrodes, and the second is the so called "magnetron" mode that results from the combined effect of the axial magnetic field and the radial component of the trapping electric field. This motion can be described as a slow radial drift of the center of cyclotron gyration along the radial isopotential contours that are centered about the cell axis. While the trapping and magnetron modes are not typically exploited for analytical purposes, the manifestation of these modes has significant and well known consequences primarily affecting mass calibration and ion retention.

Mass analysis of the trapped ions is initiated by exposure to an electric field that is perpendicular to the magnetic field and oscillates at the cyclotron frequency of the ions to be analyzed. Such a field is typically created by applying appropriate differential potentials to a second pair of parallel-plate "excite" electrodes oriented parallel to the magnetic axis and disposed on opposing sides of the radial dimension of the initial ion population.

If ions of more than one mass are to be analyzed, the frequency of the oscillating field may be swept over an appropriate range, or be comprised of an appropriate mix of individual frequency components. When the frequency of the oscillating field matches the cyclotron frequency for a given ion mass, all of the ions of that mass will experience resonant acceleration by the electric field and the radius of their cyclotron motion will increase.

An important feature of this resonant acceleration is that the initial radial dispersion of the ions is essentially unchanged. The excited ions will remain grouped together on the circumference of the new cyclotron orbit, and to the extent that the dispersion is small relative to the new cyclotron radius, their motion will be mutually in phase or coherent. If the initial ion population consisted of ions of more than one mass, the acceleration process will result in a multiple isomass ion bundles, each orbiting at its respective cyclotron frequency.

The acceleration is continued until the radius of the cyclotron orbit brings the ions near enough to one or more detection electrodes to result in a detectable image charge being induced on the electrodes. Typically these "detect" electrodes consist of a third pair of parallel-plate electrodes disposed on opposing sides of the radial dimension of the initial ion population and oriented perpendicular to both the excite and trap electrodes. Thus the three pairs of parallel-plate electrodes employed for ion trapping, excitation, and detection are mutually perpendicular and together form a closed box-like structure referred to as a trapped ion cell. FIG. 1 shows a simplified diagram for a trapped ion cell 12 having trap electrodes 12*a* and 12*b*; excite electrodes 12*c* and 12*d*; and detect electrodes 12*e* and 12*f*.

As the coherent cyclotron motion within the cell causes each isomass bundle of ions to alternately approach and recede from a detection electrode 12*e*, 12*f*, the image charge on the detection electrode correspondingly increases and decreases. If the detection electrodes 12*e*, 12*f* are made part of an external amplifier circuit (not shown), the alternating image charge will result in a sinusoidal current flow in the external circuit. The amplitude of the current is proportional to the total charge of the orbiting ion bundle and is thus indicative of the number of ions present. This current is amplified and digitized, and the frequency data is extracted by means of the Fourier transform. Finally, the resulting frequency spectrum is converted to a mass spectrum using the relationship in Equation 1.

Referring now to FIG. 2, there is shown a general implementation of a FTICR MS 10. The FTICR MS 10 consists of seven major subsystems necessary to perform the analytical sequence described above. The trapped ion cell 12 is contained within a vacuum system 14 comprised of a chamber 14*a* evacuated by an appropriate pumping device 14*b*. The chamber is situated within a magnet structure 16 that imposes a homogeneous static magnetic field over the dimension of the trapped ion cell 12. While magnet structure 16 is shown in FIG. 2 as a permanent magnet, a superconducting magnet may also be used to provide the magnetic field.

The sample to be analyzed is admitted to the vacuum chamber 14*a* by a sample introduction system 18 that may, for example, consist of a leak valve or gas chromatograph column. The sample molecules are converted to charged species within the trapped ion cell 12 by means of an ionizer 20 which typically consists of a gated electron beam passing through the cell 12, but may consist of a photon source or other means of ionization. Alternatively, the sample molecules may be created external to the vacuum chamber 14*a* by any one of many different techniques, and then injected along the magnetic field axis into the chamber 14*a* and trapped ion cell 12.

The various electronic circuits necessary to effect the trapped ion cell events described above are contained within an electronics package 22 which is controlled by a computer based data system 24. The data system 24 is also employed to perform reduction, manipulation, display, and communication of the acquired signal data.

The total number of ions created or obtained during an ionization or ion introduction event in FTICR MS 10 is not known. The total number of ions could be used for many purposes including qualitative analysis, pressure determinations, ionization process characterization and space charge determination. Therefore, it is desirable to know the total number of ions created or obtained during an ionization or ion introduction event.

One technique now used to determine the total number of ions in an experiment is to individually quantitate and sum each peak in the broad band FTICR mass spectrum acquired for that experiment. One limitation on the utility of this technique is that the technique cannot detect the ions that have cyclotron resonance that are outside the bandwidth of the experiment. Another limitation on the utility of this technique is that the measured ion population is left in a state that precludes subsequent analysis without complex ion axialization procedures. A further limitation on this technique is that the technique is computationally complex and time consuming. Thus it is desirable to have a technique for determining the total number of ions that does not have the limitations described above. The technique of the present invention which uses ion magnetron resonance (IMR) does not have such limitations.

SUMMARY OF THE INVENTION

A method for determining total ion number in a Fourier transform ion cyclotron resonance (FTICR) mass spectrometer (MS) having a trapped ion cell. The method use the on-resonance technique and includes the steps of:

a. ionizing a sample in said trapped ion cell;

b. exciting the ionized sample at a frequency which gives rise to ion magnetron resonance in the ionized sample;

c. detecting an ion magnetron resonance signal from the excited ionized sample; and d. determining said total ion number from the amplitude of the detected ion magnetron resonance signal.

A method for determining total ion number in a Fourier transform ion cyclotron resonance (FTICR) mass spectrometer (MS) having a trapped ion cell. The method uses the off-resonance technique and includes the steps of:

a. ionizing a sample in the trapped ion cell;

b. exciting the ionized sample at a frequency which is near to but not equal to that frequency which gives rise to ion magnetron resonance in the ionized sample and simultaneously detecting a signal representative of ion motion from the excited ionized sample; and c. determining the total ion number from the amplitude of the detected ion motion representative signal.

DESCRIPTION OF THE PREFERRED EMBODIMENT(S)

Under most ICR MS experimental conditions all of the ions present in the trapped ion cell will have the same magnetron frequency. Only those ions with a mass to charge ratio approaching the so called critical mass will have a magnetron frequency that differs significantly from that of less massive ions. Because ICRMS performance deteriorates markedly for ions near the critical mass, the trap is rarely operated in a near-critical mode.

Given that all ions in the trap have the same magnetron frequency, the total ion determination can be made by deliberate excitation and detection of the magnetron mode. This experiment requires excitation at only one easily accessible frequency and therefore is known as the on-resonance technique. The on-resonance technique further requires subsequent detection of only a single resonance representing the entire population of ions in the trap. As in the FTICR experiment, the amplitude of the detected resonance signal is indicative of the number of ions responsible for the signal. It is interesting to note that because the detected IMR signal consists of only one frequency, the amplitude of the signal may be determined directly without resort to Fourier transformation.

The on-resonance IMR experiment may be implemented on any FTICR spectrometer without physical modification of the instrument given that the excitation and detection systems have bandwidths sufficient for creation and manipulation of the relatively low frequency signals that correspond to the magnetron frequency regime. A simple experiment sequence sufficient for effecting the IMR measurement consists of the following events:

1) Sample introduction

2) Sample ionization

3) Magnetron excitation

4) Magnetron detection

5) Data reduction

This event sequence parallels the basic FTICR experiment sequence with the substitution of magnetron for cyclotron frequencies.

Figure 3A:
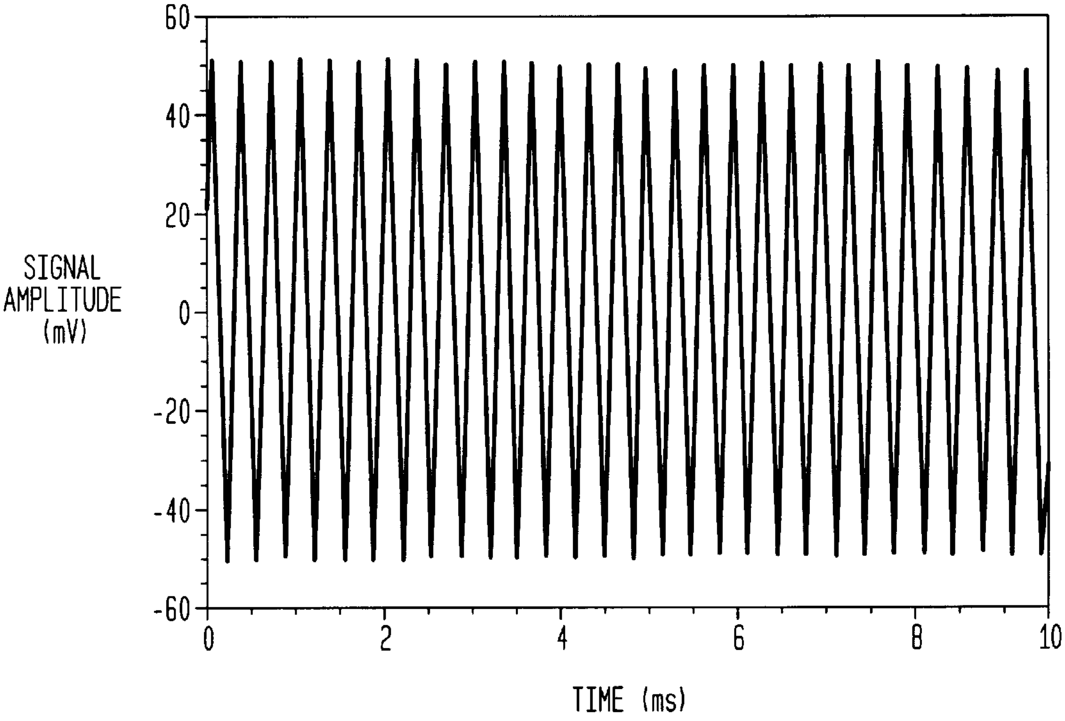
FIG. 3*a* shows the transient acquired following on-resonance excitation of the magnetron mode of a FTICR MS.
Figure 3B:
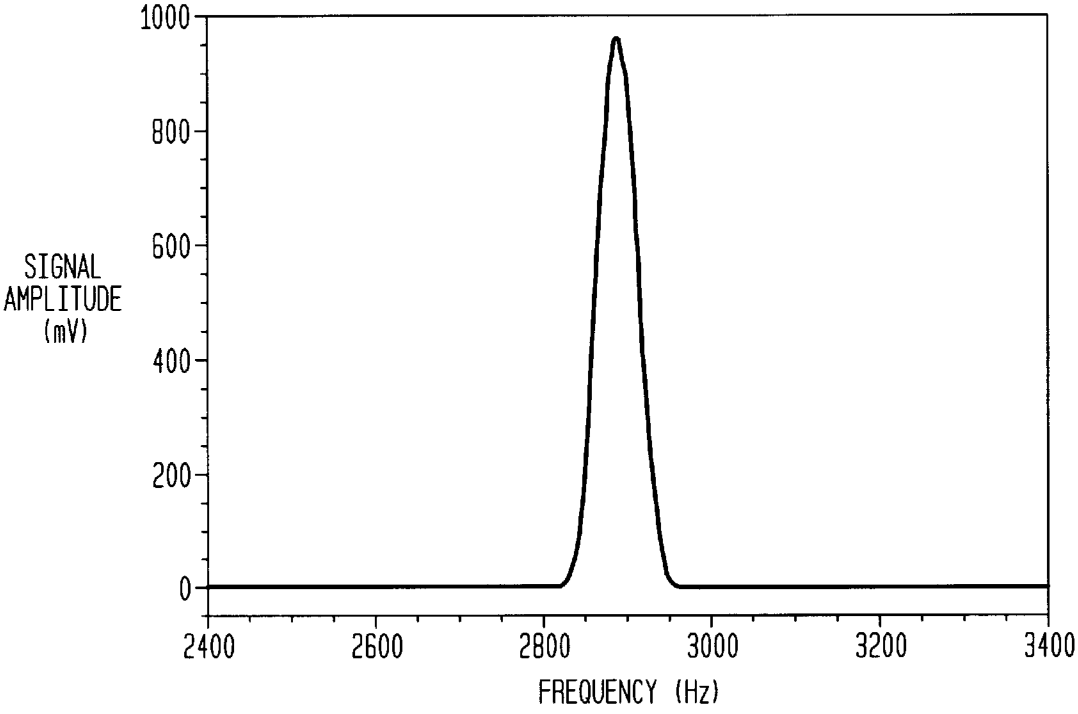
FIG. 3*b* shows the frequency spectrum of a segment of the signal in FIG. 3*a*.

One example of the results of an on-resonance experiment is shown in FIGS. 3*a* and 3*b*. FIG. 3*a* shows a 10 ms segment of an ion magnetron resonance transient acquired following resonant excitation of the magnetron mode. FIG. 3*b* shows the frequency spectrum resulting from the Fourier transform of a 40 ms segment of the signal shown in FIG. 3*a*. It should be noted that there is only a single frequency component. Therefore, the amplitude of the detected resonance signal shown in FIG. 3*a* is indicative of the number of ions responsible for the signal.

For those on-resonance IMR experiments in which further manipulation or analysis of the ion population is required following the IMR measurement, the excited ion population must first be returned to the cell axis. This axialization may be effected by either of two different techniques that have been previously described in the FTICR literature. The first and simplest of these techniques is phase-reversed de-excitation. In this technique the excited ion population is exposed to a waveform that exhibits a magnetron frequency power spectrum similar to that employed for excitation. The application of the waveform is, however, timed such that the magnetron frequency component is 180 degrees out-of-phase with the previously induced ion motion. This results in the deceleration or de-excitation of the ions and returns them near their original axial position in the cell.

The second axialization technique is referred to as quadrupolar axialization. This technique requires that a relatively high pressure buffer gas be introduced to the trapped-ion cell while applying a quadrupolar excitation waveform at the so-called "unperturbed" cyclotron frequency. This results in conversion of the magnetron motion to cyclotron motion which is rapidly damped to the cell axis. This technique is considerably more complex than phase-reversed de-excitation and further requires instrument modifications to effect gas introduction and rapid switching of cell leads to convert between the quadrupolar and conventional dipolar excite and detect modes. It does, in principle, offer the advantage of allowing the ion dispersion to be reduced to a radius even smaller than that originally exhibited by the initially created ion population.

As was described above, in the on-resonance technique the measurement process leaves the ion population in a radially dispersed state not amenable to subsequent excitation and detection unless the ions are recentered in the trap using techniques such as phase inverted de-excitation or the experimentally more complex quadrupolar axialization. Although either of these recentering or reaxialization techniques is a viable solution, the radially dispersed state of the ions may be avoided with an alternative IMR technique employing simultaneous off-resonance excitation and detection.

In the alternative IMR technique the magnetron mode is excited at a frequency near, but not equal to, the magnetron frequency while simultaneously detecting the resulting ion motion. This off resonance excitation results in an alternating excitation and de-excitation of the magnetron mode as the drive frequency "beats" with the normal magnetron mode frequency. The duration of the off-resonance excitation may be chosen to be an integer multiple of the beat frequency such that the ions are left in their de-excited position near the axis of the trap. The ion population is thereby left in a state that is amenable to subsequent analysis.

While the detected motion for the off-resonance IMR experiment consists of two frequency components, the amplitude of either component, or the amplitude of the net signal envelope, may be employed to determine the number of ions responsible for the signal. An advantage of using the net signal is that, as was the case for the on-resonance IMR experiment previously described, Fourier transform techniques are not required for determination of the signal amplitude.

An important feature of the off-resonance IMR experiment is that excitation and detection of the ion motion must occur simultaneously. This is not typically possible in conventional FTICR instruments because capacitive coupling of the excite and detect electrodes results in saturation of the signal detection amplifier during application of the excitation waveform. There are, however, several techniques available for implementing simultaneous excitation and detection as will be described below.

The off-resonance IMR experiment technique of the present invention has the advantage of returning the ion population to the cell axis in a manner intrinsic to the excitation process. Thus the off-resonance experiment technique of the present invention does not require any additional axialization events.

Figure 4A:
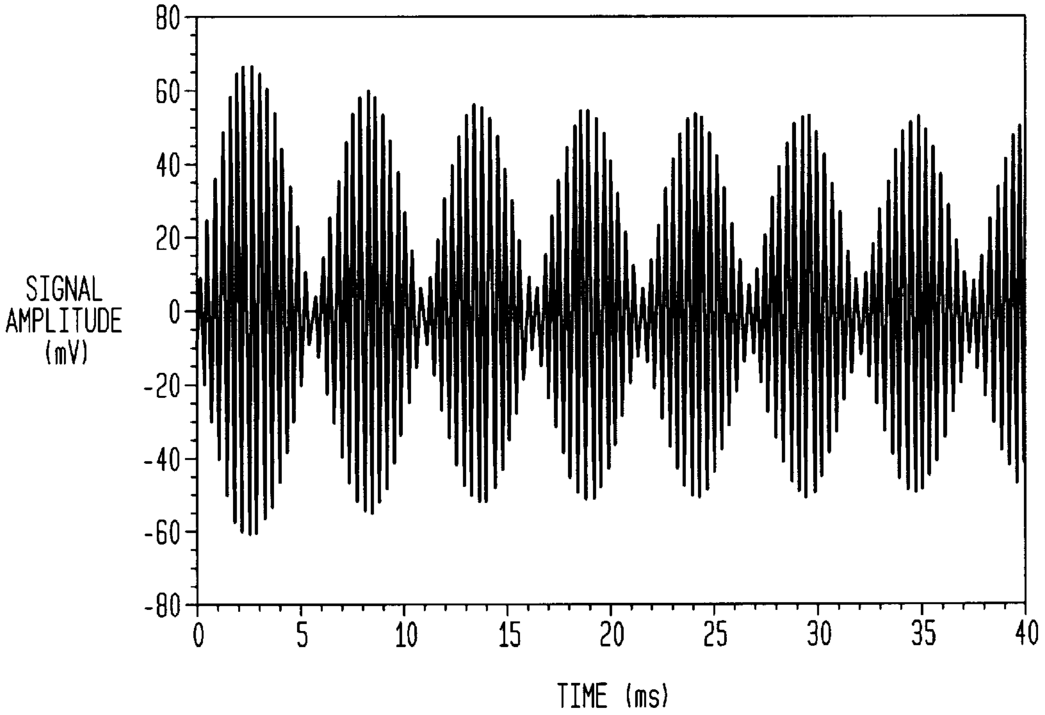
FIG. 4*a* shows the transient acquired after off-resonance excitation of the magnetron mode.
Figure 4B:
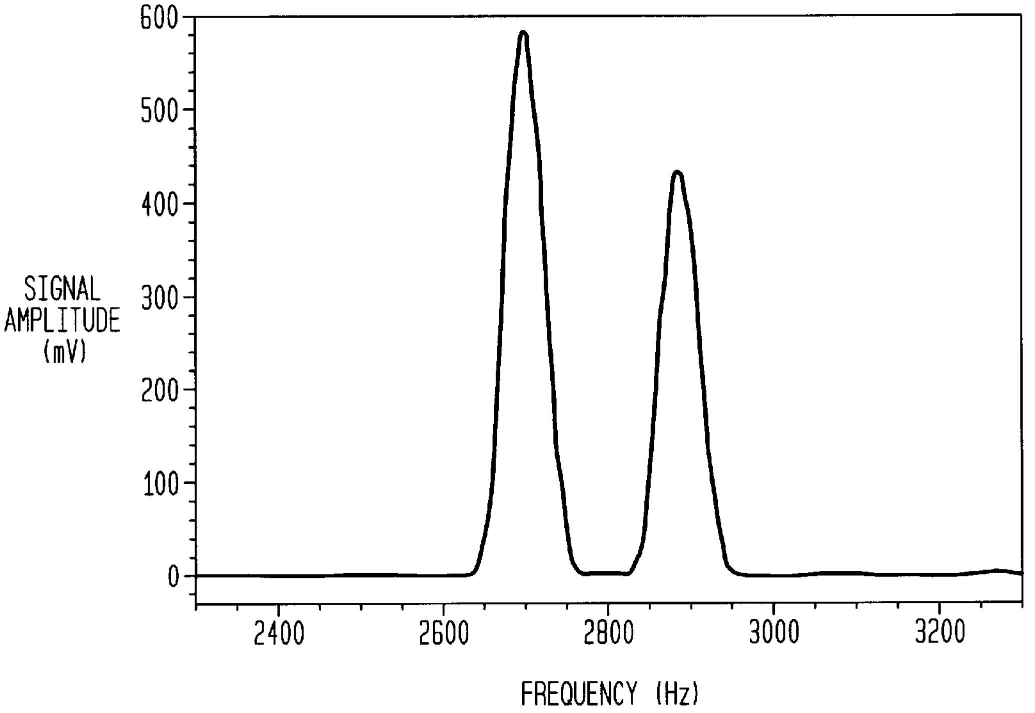
FIG. 4*b* shows frequency spectrum of the signal shown in FIG. 4*a*.

One example of the results of an off-resonance experiment is shown in FIGS. 4*a* and 4*b*. FIG. 4*a* shows a 40 ms transient acquired during off-resonance excitation of the magnetron mode. FIG. 4*b* shows the frequency spectrum resulting from the Fourier transform of the signal shown in FIG. 4*a*. It should be noted that the spectrum indicates two distinct frequency components corresponding to the magnetron and excitiation frequencies. The amplitude of either component, or the amplitude of the net signal envelope, may be employed to determine the number of ions responsible for the signal.

Figure 1:
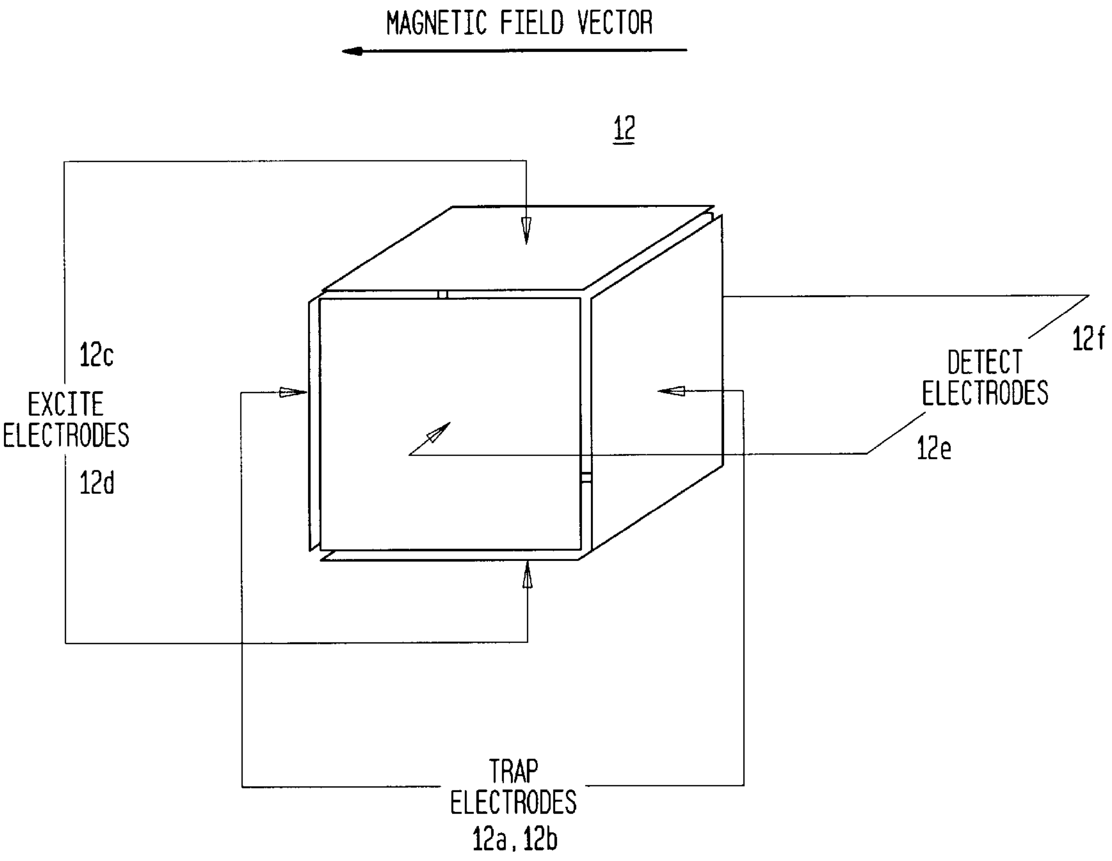
FIG. 1 shows a simplified diagram for a trapped ion cell.
Figure 2:
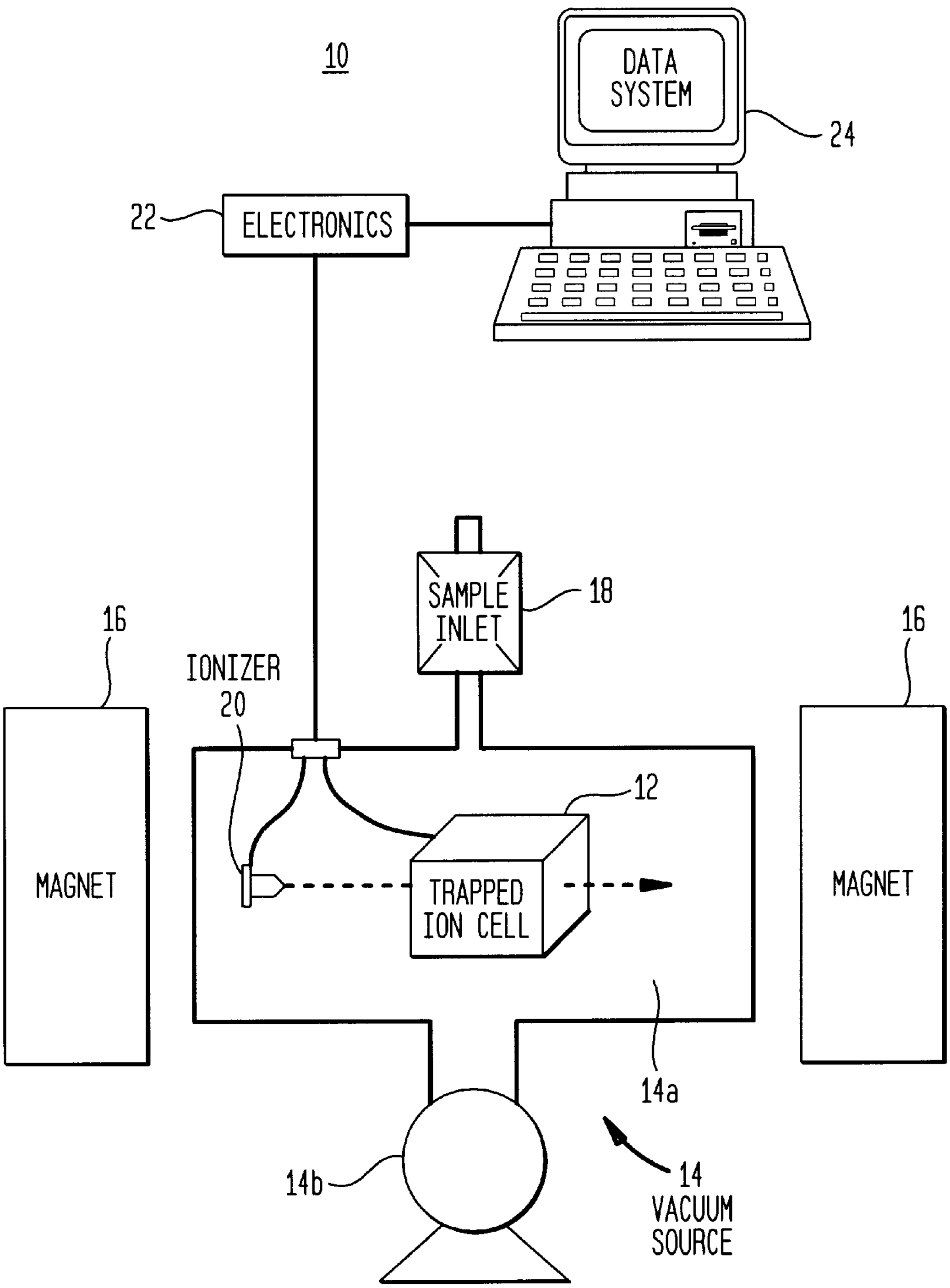
FIG. 2 shows a block diagram of a typical FTICR MS.

Implementation of the off-resonance IMR experiment requires that the conventional FTICR spectrometer 10 of FIG. 2 be modified to permit simultaneous excitation and detection of ion motion. There are several alternative approaches to such implementation including signal filtering, resonant detection, measurement of power absorbed from the excitation circuit, and capacitive nulling of the coupled excite signal.

As was previously described, the signal that results from off-resonance IMR consists of two components; one at the natural magnetron frequency and a second at the off-resonance excitation frequency. The latter component is made up of contributions from the capacitively coupled excite signal as well as the signal induced by the corresponding component of the excited ion population "beat" motion. If the frequency difference between the excitation and magnetron frequencies is large enough, the excite signal component may be electronically filtered from the detection circuit prior to signal amplification without inducing significant attenuation of the magnetron signal component.

An alternative technique for discriminating between the excitation and magnetron signals is to employ resonant detection. This requires the use of an auxiliary detection circuit that is tuned to resonance at the magnetron frequency and exhibits no significant response to other frequencies.

A third approach to simultaneous excitation and detection is to monitor the power absorbed from the excitation circuit as was done in ICR instruments prior to introduction of the image charge detection and Fourier transform techniques of Comisarow and Marshall. The power absorbed is directly proportional to the number of ions present in the absorbing ion population.

Perhaps the most simple and advantageous technique for simultaneous excitation and detection is to null the coupled excite signal by balancing the net capacitances between the excite and detect circuits. Given that the excite waveform is applied differentially to the trapped-ion cell, the potential exists for balancing the net coupling of the two out-of-phase excitation components such that they exactly cancel each other at the detection amplifier inputs. Such nulling requires only that the inter-electrode capacitances be measured and appropriate variable capacitors be added in parallel with these capacitances such that the net coupling may be adjusted or tuned to achieve the desired nulling.

Figure 5:
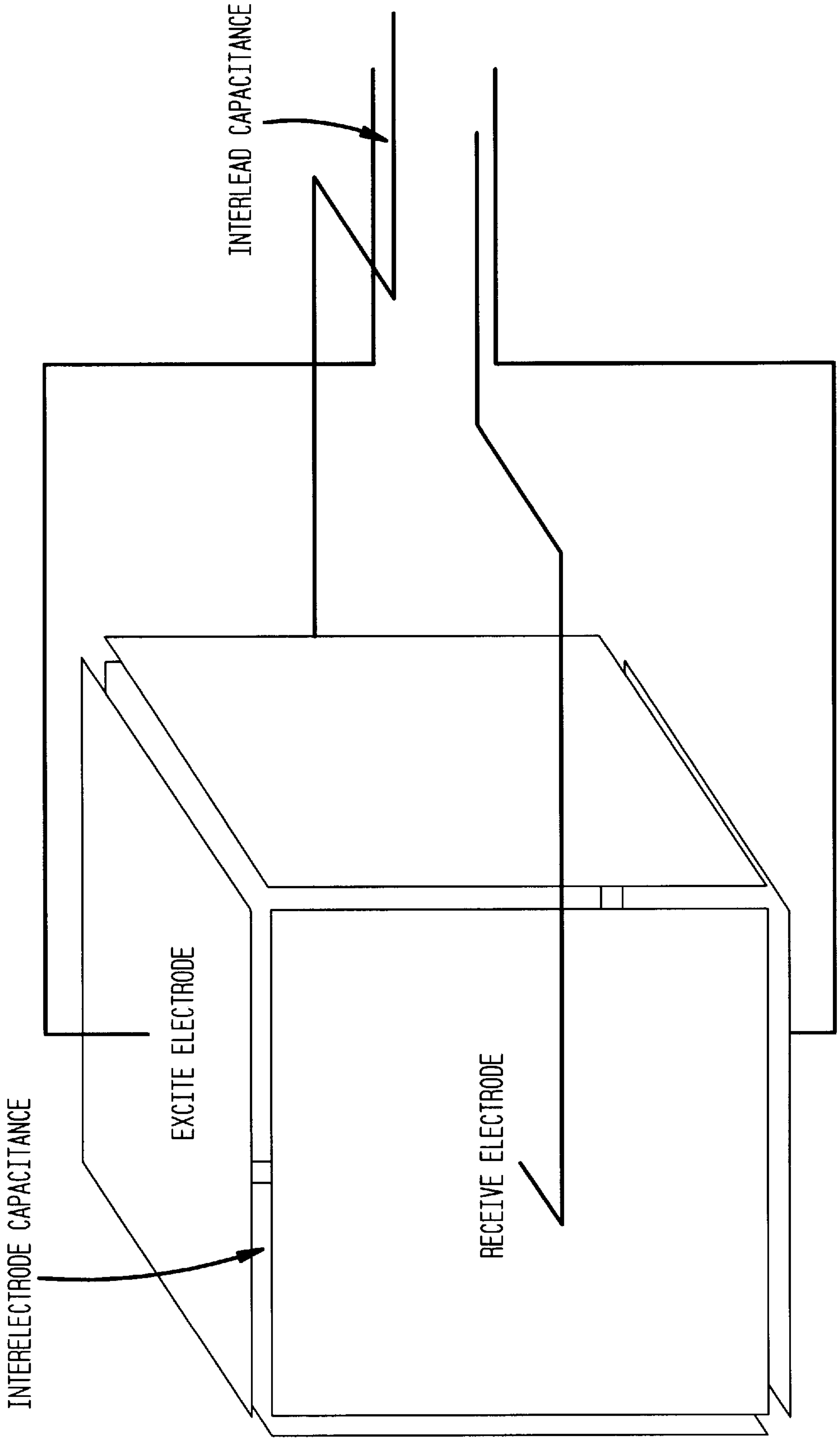
FIG. 5 shows the interelectrode and interlead capacitances for the cell shown in FIG. 1.

Referring to now FIG. 5, there is shown a simplified diagram of cell 12 which shows the principal sources of capacitive coupling. As is shown in FIG. 5, the principal sources of such capacitance are the interelectrode capacitance between the excite 12*c*, 12*d* and detect or receive 12*e*, 12*f* electrodes and the interlead capacitance between the excite leads 13*a*–13*b* and the receive leads 13*c*–13*d* for those electrodes.

Figure 6:
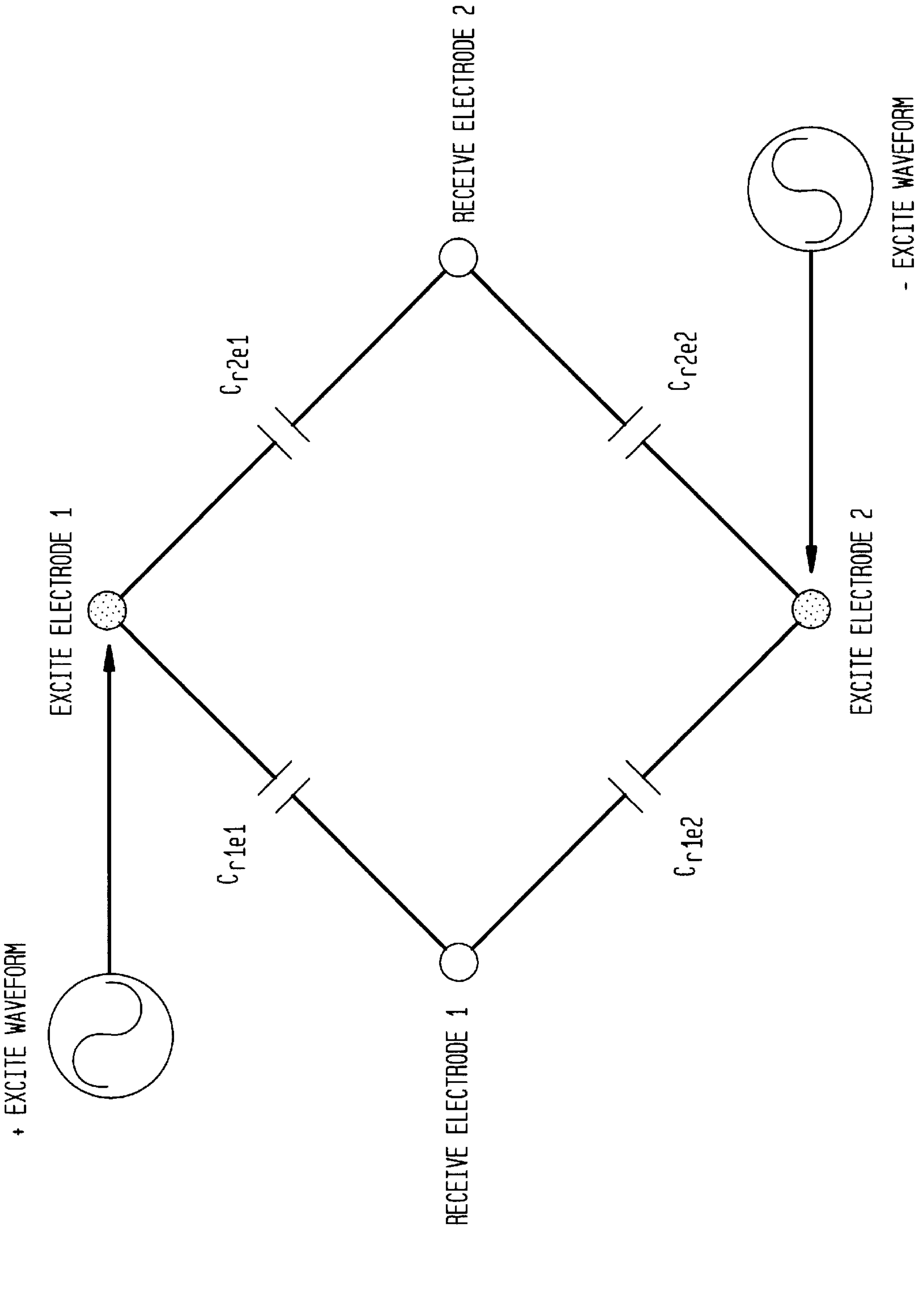
FIG. 6 shows an equivalent circuit schematic of the capacitances shown in FIG. 5.
Figures 7A, 7B:
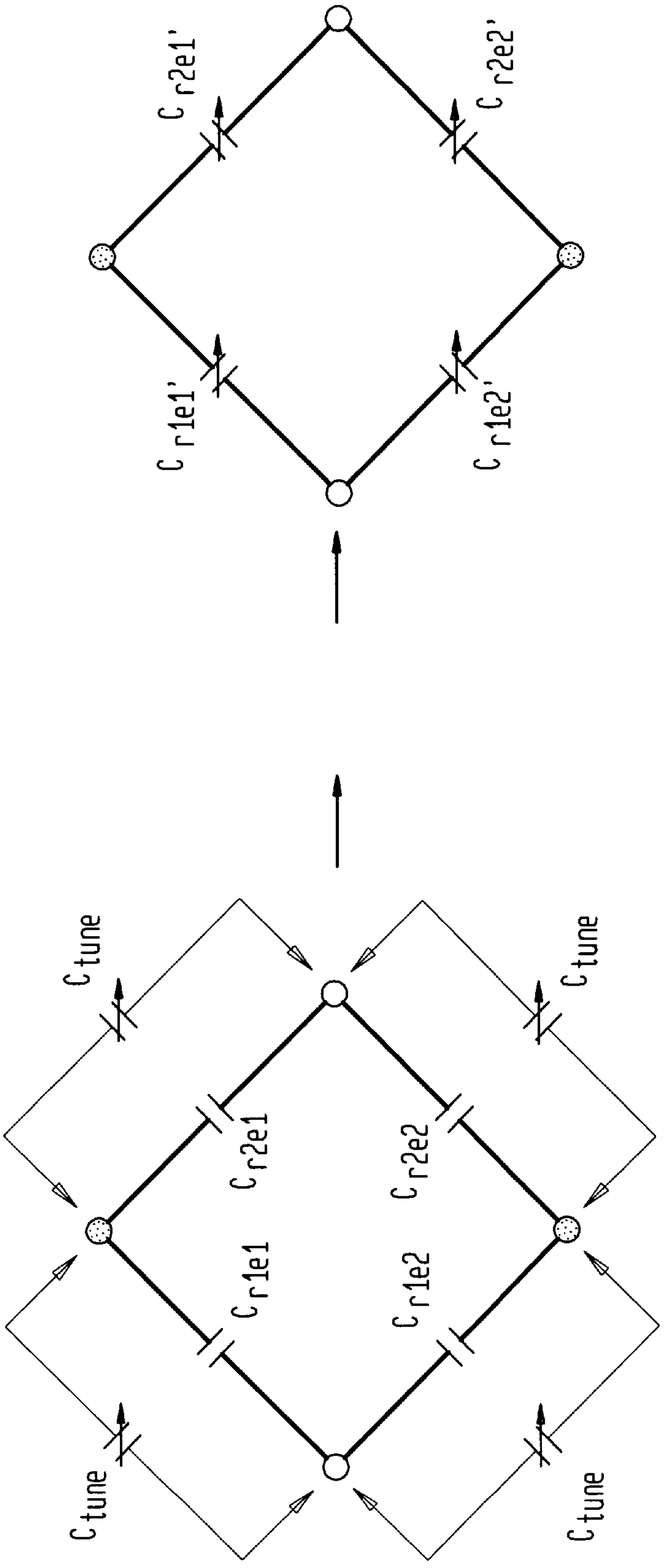
FIGS. 7*a* and 7*b* show, respectively, the variable tuning capacitors connected in the circuit of FIG. 6 and an equivalent circuit schematic therefor.

FIG. 6 shows the equivalent circuit for the interelectrode and interlead coupling capacitances, $C_{r1e1}$ to $C_{r2e2}$. FIG. 7*a* shows the variable capacitor, $C_{tune}$, added between each excite/detect electrode lead pair. The variable capacitor is added in parallel with each of the coupling capacitances. FIG. 7*b* shows the equivalent circuit for the circuit shown in FIG. 7*a* wherein the parallel combination of each variable capacitor and the associated coupling capacitance is represented as the variable capacitor $C_{r1e1}$, to $C_{r2e2}$.

Figure 8A:
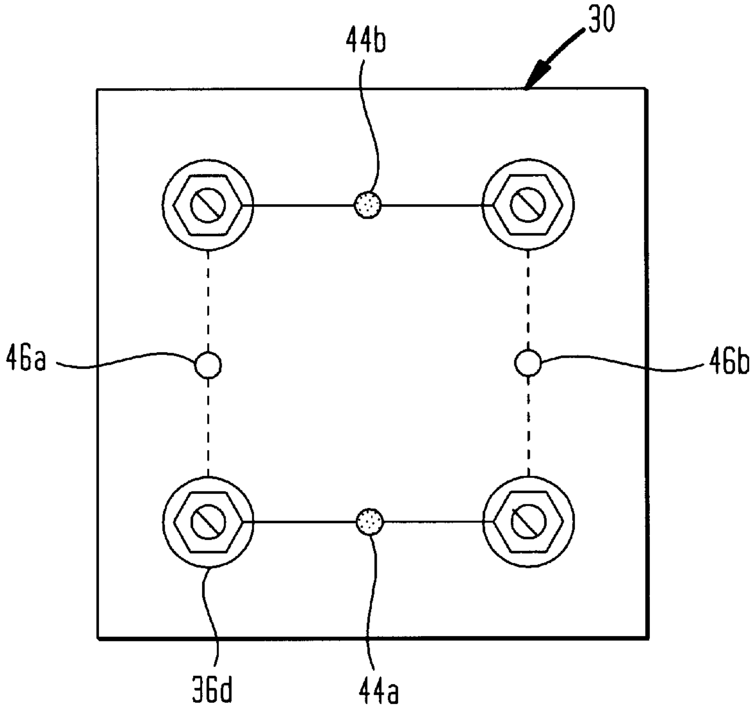
FIGS. 8*a* and 8*b* show front and side views, respectively, of a variable capacitor interface board.
Figure 8B:
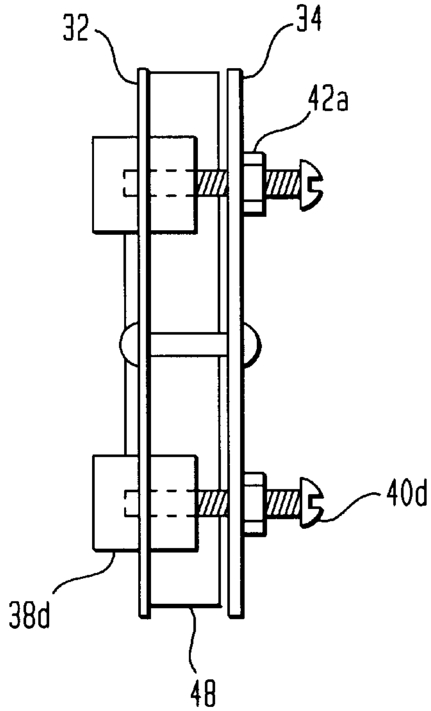

FIGS. 8*a* and 8*b* show the front and side views, respectively, of a interface board 30 which was used to modify a conventional FTICR spectrometer to provide the tuning capacitors and thereby permit simultaneous excitation and detection of ion motion. As is shown in FIG. 8*b*, interface board 30 includes first and second circuit boards 32, 34. A grounded shield 48 separates the circuit boards 32, 34. Circuit board 32 has two connections 44*a*–44*b* for the excite leads 13*a*–13*b* and two connections 46*a*–46*b* for the receive leads 13*c*–13*d*.

Interface board 30 has four variable capacitor assemblies 36*a*–36*d*, thereon, each assembly situated proximate an associated corner of the interface board 30. Each assembly 36*a*–36*d* consists of a copper tube 38*a*–38*d* and an associated screw 40*a*–40*d* and nut 42*a*–42*d*. In one embodiment for the assemblies 36*a*–36*d*, the tubes 38*a*–38*d* were made from 6.35 mm OD×1 cm copper tubes, and the screws 40*a*–40*d* and the nuts 42*a*–42*d* were size 4–40.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for determining total ion number in a Fourier transform ion cyclotron resonance (FTICR) mass spectrometer (MS) having a trapped ion cell comprising the steps of:

a. ionizing a sample in said trapped ion cell;

b. exciting said ionized sample at a frequency which gives rise to ion magnetron resonance in said ionized sample;

c. detecting an ion magnetron resonance signal from said excited ionized sample;

d. determining said total ion number from the amplitude of said detected ion magnetron resonance signal; and e. returning said excited ionized sample to the axis of said trapped ion cell.

2. The method of claim 1 wherein said sample is a gas.

3. A method for determining total ion number in a Fourier transform ion cyclotron resonance (FTICR) mass spectrometer (MS) having a trapped ion cell comprising the steps of:

a. ionizing a sample in said trapped ion cell;

b. exciting said ionized sample at a frequency which is near to but not equal to that frequency which gives rise to ion magnetron resonance in said ionized sample and simultaneously detecting a signal representative of ion motion from said excited ionized sample; and c. determining said total ion number from the amplitude of said detected ion motion representative signal.

4. The method of claim 3 wherein said trapped ion cell has excite and detect electrodes and leads connected thereto and said step of exciting said ionized sample and simultaneously detecting said ion motion representative signal and said FTICR MS includes means for nulling of the interelectrode capacitances between said excite and detect electrodes.

5. The method of claim 4 wherein said means for nulling of said inter-electrode capacitances also nulls the inter-lead capacitances between said leads connected to said excite and said detect electrodes.

6. The method of claim 3 wherein said exciting frequency beats with a frequency that corresponds to ion magnetron motion to thereby produce a beat frequency and the duration of said exciting frequency is chosen to be an integer multiple of said beat frequency.

7. The method of claim 3 wherein said sample is a gas.

* * * * *